United States Patent [19]
Halpern

[11] Patent Number: 5,524,188
[45] Date of Patent: Jun. 4, 1996

[54] VIEWING THREE DIMENSIONAL OBJECTS BY ROTATIONAL WOBBLE ABOUT MULTIPLE AXES

[75] Inventor: Benjamin R. Halpern, San Jose, Calif.

[73] Assignee: Halpern Software, Inc., San Jose, Calif.

[21] Appl. No.: 24,500

[22] Filed: Mar. 1, 1993

[51] Int. Cl.$^6$ .................................................. G06T 15/70
[52] U.S. Cl. .......................................... 395/120; 395/137
[58] Field of Search ...................................... 414/772, 776; 395/120, 137, 119; 359/212, 213, 857

[56] References Cited

U.S. PATENT DOCUMENTS

| | | | |
|---|---|---|---|
| 3,996,804 | 12/1976 | Neufeld | 73/457 |
| 4,414,565 | 11/1983 | Shanks | 348/44 |
| 4,449,886 | 5/1984 | Kalua | 414/776 |
| 4,462,044 | 7/1984 | Thomason et al. | 348/44 |
| 4,558,359 | 12/1985 | Kuperman et al. | 348/44 |
| 4,672,435 | 6/1987 | Gluck | 348/44 |
| 4,752,828 | 6/1988 | Chapuis et al. | 395/137 X |
| 4,796,029 | 1/1989 | Duppong et al. | 414/772 |
| 4,871,904 | 10/1989 | Metlitsky et al. | 359/212 X |
| 4,941,041 | 7/1990 | Kenyon | 348/44 |
| 4,984,179 | 1/1991 | Waldern | 364/514 |
| 5,015,188 | 5/1991 | Pellosie, Jr. et al. | 395/119 X |
| 5,096,291 | 3/1992 | Scott | 356/237 |
| 5,148,310 | 9/1992 | Batchko | 359/479 |
| 5,173,796 | 12/1992 | Palm et al. | 359/202 |
| 5,239,404 | 8/1993 | McLaughlin et al. | 359/226 |
| 5,261,820 | 11/1993 | Slye et al. | 395/152 X |
| 5,263,382 | 11/1993 | Brooks et al. | 74/471 |
| 5,268,998 | 12/1973 | Simpson | 395/119 X |

FOREIGN PATENT DOCUMENTS

| | | | |
|---|---|---|---|
| 2642949 | 8/1990 | France | 5/25 |

OTHER PUBLICATIONS

Kallis, Jr, Computer Animation Techniques, Journal of SMPTE, vol. 80, No. 3, Mar. 1971, p. 145–148.

Paracomp, Swivel 3D Professional User's Guide, 1990, pp. 3–1 to –9, 4–1 to 4–16, 5–8 to 5–11, 14–1 to 14–5, 15–1 to 15–11, 18–1 to 18–8, Quick Reference Guide.

Chen et al, A Study in Interactive 3–D Rotation Using 2–D Control Devices, Computer Graphics, vol. 22, No. 4, Aug. 1988, pp. 121–129.

Glassner, Andrew S., "Spacetime Ray Tracing for Animation," University of North Carolina at Chapel Hill, IEEE Computer Graphics & Applications, Mar. 1988, pp. 60–70.

Harris, Marilyn A., "Graphics–Display System Simulates Full–Motion Video," Electroncis Report, New York Bureau, Jan. 12, 1984, pp. 47–48.

Vickers, Donald L., "The Role of Computer–Generated Movies in Scientific Research," Computer Society International Conference, IEEE Computer Society, 1979, pp. 250–256.

(List continued on next page.)

Primary Examiner—Mark K. Zimmerman
Assistant Examiner—Anton W. Fetting
Attorney, Agent, or Firm—Hickman Beyer & Weaver

[57] ABSTRACT

A method of viewing an object by imparting a continuous, steady, cyclic motion to the object which keeps the orientation of the object substantially the same. The object can be a real 3-D object or can be an abstract object such as those used in 3-D computer graphics. Real objects viewed in an apparatus which includes a support, a viewpoint, and a mechanism for imparting a relative wobble between the support and the viewpoint to create a wobbling image of the object. In one embodiment, the support is caused to wobble and the viewpoint is substantially stationary, and in another embodiment the support is substantially stationary and the image at the viewpoint is caused to wobble. A computer implemented process for viewing the object includes the steps of developing, within a computer system, a description of a 3-D object, specifying a wobble procedure, and displaying an animated representation of the object on a visual display as determined by the wobble procedure.

16 Claims, 12 Drawing Sheets

OTHER PUBLICATIONS

"Computer Animation Techniques," Journal of the Society of Motion Picture & Television Engineers, Mar. 1971, vol. 80, No. 3, pp. 145–148.

Liu et al., Interaction of Visual Depth Cues and Viewing Parameters During Simulated Telemanipulation, Proc. of IEEE Intl. Conf. on Robotics and Automation, Apr. 1991, pp. 2286–2291.

Wanger et al., Perceiving Spatial Relationships in Computer Generated Images, IEEE Computer Graphics and Animation, May 1992, pp. 44–58.

Klymenko, The Resonance Theory of Kinetic Shape Perception, Visualization in Biomedial Computing, 1990, pp. 223–230.

Heeger et al., Recovering Observer Translation with Center–Surround Operators, Visual Motion 1991, pp. 95–100.

VIEWING THREE DIMENSIONAL OBJECTS BY ROTATIONAL WOBBLE ABOUT MULTIPLE AXES

BACKGROUND OF THE INVENTION

This invention relates to a method and apparatus for viewing three dimensional objects to promote a greater understanding of their structure.

It is desirable to be able to view a three dimensional (3-D) object, especially a complex object such as a molecule, in such a way as to understand its structure. A number of methods for viewing 3-D objects have been devised to help with this understanding.

U.S. Pat. No. 4,941,041, of Kenyon and entitled "Pulfrich Illusion Turntable" teaches a method that utilizes the Pulfrich illusion for converting two dimensional (2-D) images into pseudo 3-D images by placing video cameras and subjects on a large turntable. In the Pulfrich illusion, the eye of an observer which is closer to a viewing screen (e.g. a television monitor) sees a moving object on the screen a fraction of a second before the other eye sees the moving object. This situation presents an illusion of duality to the brain, which converts the flat pictures that the eyes are actually seeing to an illusion of 3-D pictures.

U.S. Pat. No. 4,414,565, of Shanks and entitled "Method and Apparatus for Producing Three Dimensional Displays", teaches a method for generating an illusion of a 3-D image from a 2-D image by projecting the 2-D image on a saddle-shaped surface. This saddle-shaped surface may be a real surface such as a light scattering glass or a surface in space formed by an optical component such as an aspheric lens or lenticular array. The saddle-shaped surface helps a viewer appreciate 3-D clues present in most 2-D images.

U.S. Pat. No. 4,558,359, of Kuperman et al. and entitled "Anaglyphic Stereoscopic Image Apparatus and Method", describes an image processing apparatus which aids in the analysis of images by introducing additional physically displaced image elements in complimentary colors. The additional image elements are generated by the digital processing of original image elements. The added elements and original image are viewed stereoscopically on an electronic reconstructed image display.

U.S. Pat. No. 4,462,044, of Thomason et al. and entitled "Timing System for a Three Dimension Vibrating Mirror Display", concerns changing the focal properties of a mirror so as to create a 3-D image from several 2-D images presented in rapid succession. The system includes an anisochronous clock which varies its clocking rate in proportion to the momentary velocity of movement through the display volume so that the displayed image planes are equally spaced throughout the depth of the display volume.

It is often desirable to be able to present 3-D images on the 2-D display of a computer system. For example, in computer-aided design (CAD) and 3-D modeling systems, machines, machine parts, and other 3-D objects can be displayed in an isometric or perspective view on the screen of the computer system. Many of such systems permit the 3-D objects to be rotated or viewed from different angles to permit a visual inspection of the object. In such a rotation, the object is typically turned by 180 degrees around a selected axis at some point in the cycle. However, for an observer to relate what is observed before and after the rotation takes quite a bit of mental gymnastics, and many intermediate depth perception clues are not provided.

Many algorithms are known to be useful in generating these 3-D images on a computer screen. These algorithms can be implemented in software, hardware, or a combination of the two. Examples of such algorithms include hidden line and surface generating algorithms, and shading algorithms such as ray tracing algorithms and radiative algorithms. Such algorithms and methods for implementing such algorithms are well known to those skilled in the art.

There are also stereoscopic methods that involving goggles, polarized light, for generating 3-D images by presenting each eye with a slightly different image. Such systems promote eyestrain and headaches if used over long periods of time, and are sometimes hard to focus. Holograms also produce 3-D images of objects, but these images tend to be of poor resolution and do not necessarily permit a tidier understanding of the objects.

SUMMARY OF THE INVENTION

The present invention preferably moves a rigid object in a smooth, continuous, cyclic motion around a base orientation. By creating cyclical motion around a base orientation, strong visual 3-D clues are presented to a viewer without the user becoming disoriented.

The method for viewing an object in accordance with the present invention imparts a continuous, steady, cyclic motion to the object which keeps the orientation of the object substantially the same. The object can be a real 3-D object or can be an abstract object such as those used in 3-D computer graphics.

Real objects can be viewed in an apparatus which includes an support, a viewpoint, and a mechanism for imparting a relative wobble between the support and the viewpoint to create a wobbling image of the object. In one embodiment, the support is caused to wobble and the viewpoint is substantially stationary, and in another embodiment the support is substantially stationary and the image at the viewpoint is caused to wobble. In either embodiment, an image of a wobbling object is created which provides a observer with a better sense of the spatial relationships between various portions of the object.

A computer implemented process for viewing the object includes the steps of developing, within a computer system, a description of a 3-D object, specifying a wobble procedure, and displaying an animated representation of the object on a visual display as determined by the wobble procedure. The step of specifying a wobble procedure includes determining the number of animation frames that are to be display, and choosing a wobble parameter, i.e. the degree of wobble that is to be imparted on the image. The display step sequentially displays the computed frames to provide the image of the object wobbling by the desired wobble parameter.

An advantage of the present invention is that changing the orientation of an object in a continuous, steady, cyclical motion that always keeps the orientation of the object approximately the same gives an observer an enriched understanding of the 3-D structure of the object. By having the orientation constantly being changed and yet never wandering far from the base orientation helps the observer study the object while receiving 3-D clues supplied by the motion. The steady, cyclic motion allows the observer to anticipate the spatial location of a given part of the figure, thereby permitting a closer scrutiny of that part.

The cyclic nature of the wobble continuously keeps several views of the object before the observer. Compared to stereoscopic methods, the method of the present invention presents the same image to both eyes of the observer, thereby avoiding the focusing problems and attendant headaches sometimes caused by stereoscopic viewers of the prior art.

These and other advantages of the present invention will become apparent to those skilled in the art upon a reading of the following specification of the invention and a study of the several figures of the drawing.

DETAILED DESCRIPTION OF THE PREFERRED EMBODIMENTS

The present invention allows an object to be viewed with a continuous, steady, cyclic motion around a base orientation such that the general orientation of the object remains substantially stable. This method for viewing an object provides strong 3-D visual clues as to the structure of the object without disorienting the viewer. The real or apparent motion which permits an object to be viewed in this fashion will be referred to herein as a "wobble."

The object being viewed may be a real object or an image of an object. For example, the image of an object can be produced on the screen of a computer system. In either circumstance, a "wobble" is imparted on the object or its image to provide a viewer with a greater understanding of its three dimensional structure. The wobble motion generated by the method and/or apparatus of the present invention provides a rapid, enriched 3-D understanding of objects such as a ball-and-stick representation of a molecule.

Figure 1:
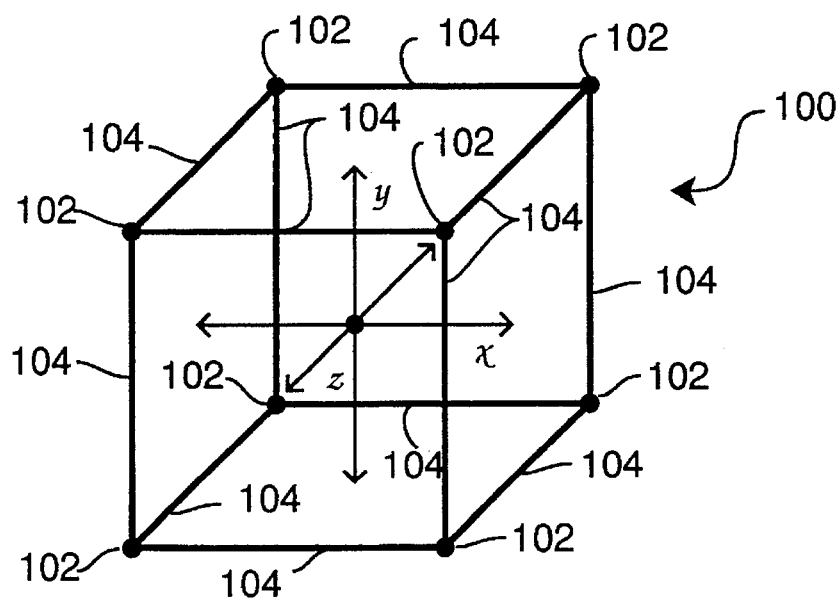
FIG. 1 is an isometric view of an open cubic object, such an NaCl crystal structure.

FIG. 1 is an isometric view of an object 100. In this instance, object 100 is a ball-an-stick representation of an NaCl (salt) molecule, which is essentially a hollow, cubical structure. Arbitrary x, y, and z are chosen to provide a coordinate system. Atoms of the molecule 100 are represented by the small balls 102, and the bonds between adjacent atoms are represented by the "sticks" 104. It can be appreciated that in this stationary, 3-D representation it is difficult to determine which of the balls 102 and sticks 104 are intended to be forward (i.e. close to the viewer) and which are intended to be back (i.e. away from the viewer). The provision of the "wobble" feature of the present invention will clearly show such spatial relationships between the various parts of a viewed object.

Figure 2:
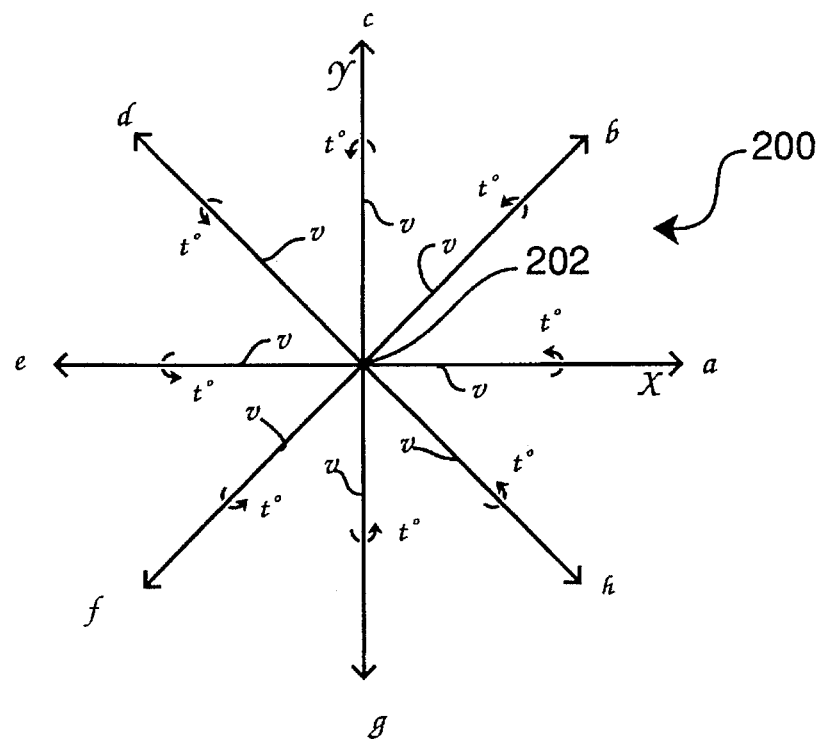
FIG. 2 is a view of an X and a Y axis and a number of rotational axes a–h.

FIG. 2 is a view of the x-y axis 200 shown in FIG. 1. A number of vectors v labeled a–h extend radially outwardly from an origin 202 of the x-y axes.

It will be useful at this point to define some terms that will be used in the following descriptions. In an arbitrary Cartesian (x,y,z) coordinate system, for an arbitrary non-zero vector v and a real number a, let $R(v, a)$ be the rotation by the angle a radians about the axis through the origin 202 in the direction given by the vector v. The rotation is defined as clockwise when looking in the direction v. Let the application of any transformation T to a vector u be denoted by Tu. For example, if T is $R(v,a)$, then Tu is the rotation, by an angle a, of u around the axis in the direction of v, i.e. $Tu=R(v,a)u$. For any geometric figure F, assumed to be a set of vectors, let the application of the transformation T to F be denoted and defined by $TF=\{Tu | u \text{ in } F\}$. For example, if F is the object 100 of FIG. 3, the eight vertices and all of the points connecting the vertices comprise vectors to be transformed by the transformation T. Because the transformation is linear, only the eight vertices (i.e. "key points") are actually transformed, and the connecting lines can be computed after the transformation. Some objects (including the cubical object of this example) can be represented by even fewer key points, reducing the computational demands on the system. Finally, let e1, e2, e3 be the unit vectors in the direction of the x, y, and z axes, respectively.

Consider the two parameter family of rotations $W(s, t)=R(R(e3, s)e1, t)$. The term $R(e3,s)e1$ determines the axis the object is to be rotated about, and the term t determines the amount of the rotation around that axis. As will be apparent to those skilled in the art, the term $R(e3,s)e1$ means "rotate the x unit vector (e1) around the z unit vector (e3) by an amount s" to obtain a vector v. If t is kept constant and s varies, the rotations $W(s, t)$ are each a rotation by an angle of t. Their axis of rotation is determined by the vector $R(e3, s)e1$. It starts at e1 when s is 0 and is rotated as s varies. It returns to e1 when $s=2\pi$. For any figure F, the motion of F through the family of transformed figures $W(s, t)F$ as s varies, is defined herein as a "simple wobble."

In order to include F itself as one point in the motion, we may apply the simple wobble to $W(0, t)^{-1}F$ in place of F, where $T^{-1}$ denotes the inverse transformation to T. The parameter t measures how much each "orientation" $W(s, t)F$ is rotated from the given orientation F. If the parameter s is varied in time at a steady rate of r radians/second, the motion is uniform and repeats every $2\pi/r$ seconds. For any integer N>0 the orientation may be sampled at N equally spaced points in s to get N frames for a movie. Set $\Delta s=2\pi/N$. The frames are given by:

$$W(0, t)F, W(\Delta s, t)F, W(2\Delta s, t)F, \ldots, W((N-1)\Delta s, t)F, W(N\Delta s, t)F=W(0, t)F$$

The transformations that carry one from the orientation in one frame to the next frame are given by:

$$T1=W(\Delta s, t)W(0,t)^{-1},$$

$$T2 = W(2\Delta s, t)W(\Delta s, t)^{-1},$$

$$T3 = W(3\Delta s, t)W(2\Delta s, t)^{-1}, \ldots$$

where the composition of two transformations U and V with U following V is denoted by UV.

Although, by a general theorem, the transformations T1, T2, . . . are individually rotations about various axes, the axes and angles of rotation are not obvious. Furthermore, the repetitive and uniform character of the successive orientations F1=F, F2=T1 F1, F3=T2 F2, . . . is not easily discernible from these axes and angles of rotation. It is therefore clear that a wobble generated by the above algorithms is much different from a simple, prior art rotation of an object.

One can change the direction of the wobble by varying s with a negative rate. Though not the preferred embodiment, the rate may vary with time. The parameter t may also vary with time. In particular, varying s at a constant rate while increasing t gives a spiral type of wobble, one that starts out barely discernible and gets more pronounced with time. The simple wobble along with these variations constitute the more general class of wobbles.

Some degenerate cases of the wobble may coincide with no motion, or a simple rotation. These degenerate wobbles are not intended to be included. The preferred embodiment places the origin inside the figure and directs the z axis toward the observer.

Transformations from one frame of a movie of the wobble to the next frame are individually rotations. But the rotations are about different axes and by an angle selected so that the motion is cyclic. An understandable description of the wobble such as that given above depends on viewing a motion in a way different from the common notion of applying a rotation or transformation to one frame to get the next frame.

Figure 3:
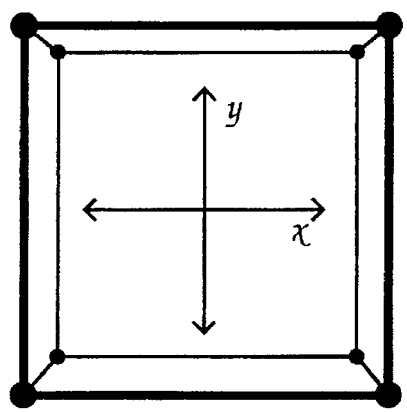
FIG. 3 is a view of the of a base orientation for the object of FIG. 1.

FIG. 3 illustrates the object 100 of FIG. 1 in an arbitrary base position F. Virtually any base position can be chosen for object 100, but the one shown in FIG. 3 is convenient because it is orthogonal to the x-y axes, thereby simplifying subsequent descriptions. For visual clarity, closer balls are indicated with larger circles, and closer sticks are indicated with wider (darker) lines.

Figure 4A:
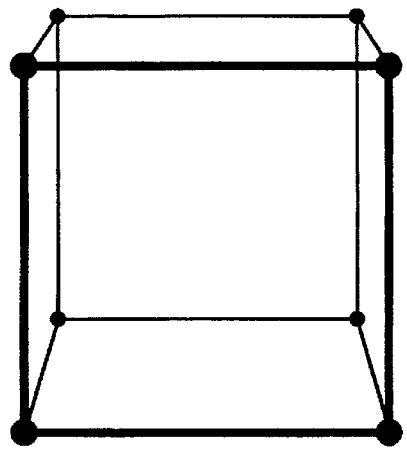
FIGS. 4a–4h illustrate the object of FIG. 3 from a variety of viewpoints.
Figure 4B:
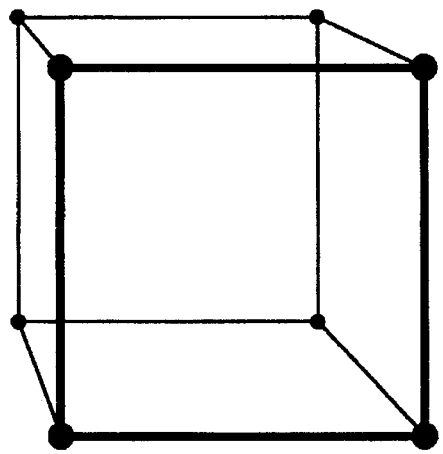
Figure 4C:
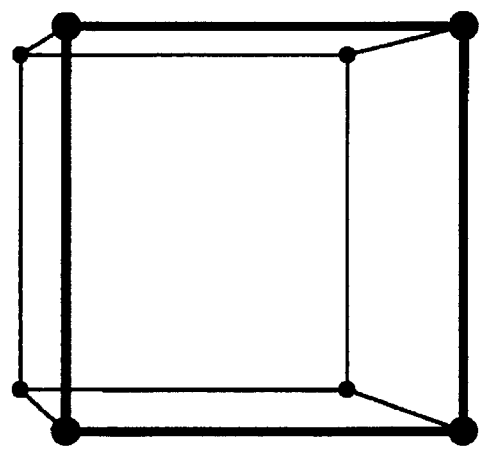
Figure 4D:
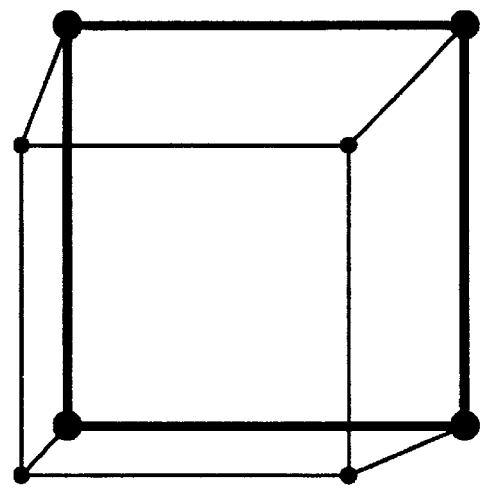
Figure 4E:
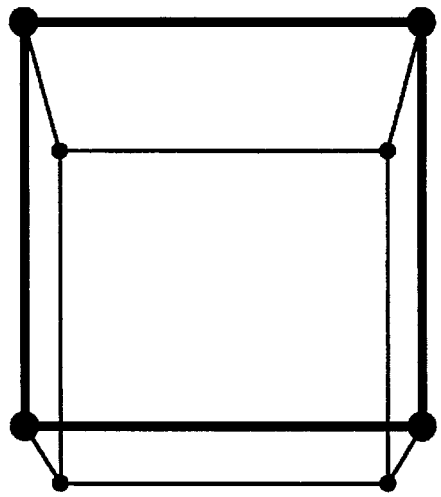
Figure 4F:
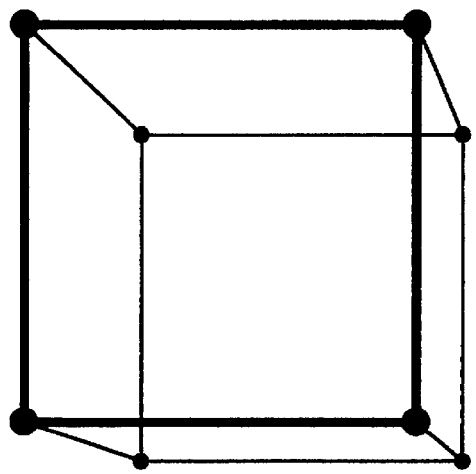
Figure 4G:
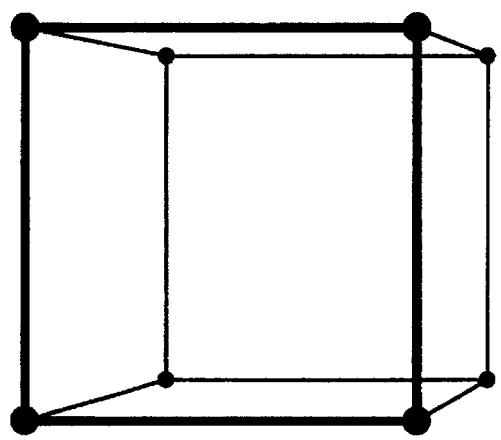
Figure 4H:
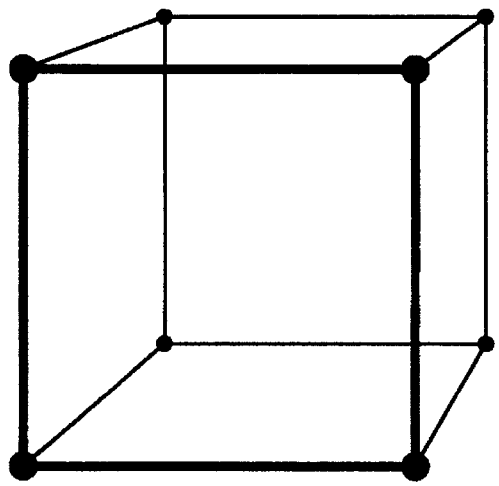

FIGS. 4a–4h illustrate various frames in the cyclical wobble sequence for object 100. It should be noted that the base position F shown in FIG. 3 is preferably not one of the frames, although it can be in alternate embodiments of the present invention. FIG. 4a shows the object 100 of FIG. 1 rotated about the axis 'a' of FIG. 2. FIG. 4b shows the object 100 of FIG. 1 rotated around the axis 'b' of FIG. 2. Similarly, FIGS. 4c–4h show the object 100 of FIG. 1 rotated around the related axis c–h, respectively, of FIG. 2. If FIGS. 4a–4h are viewed in rapid sequence, the object 100 will "wobble" in accordance with the method of the present invention.

Figure 5:
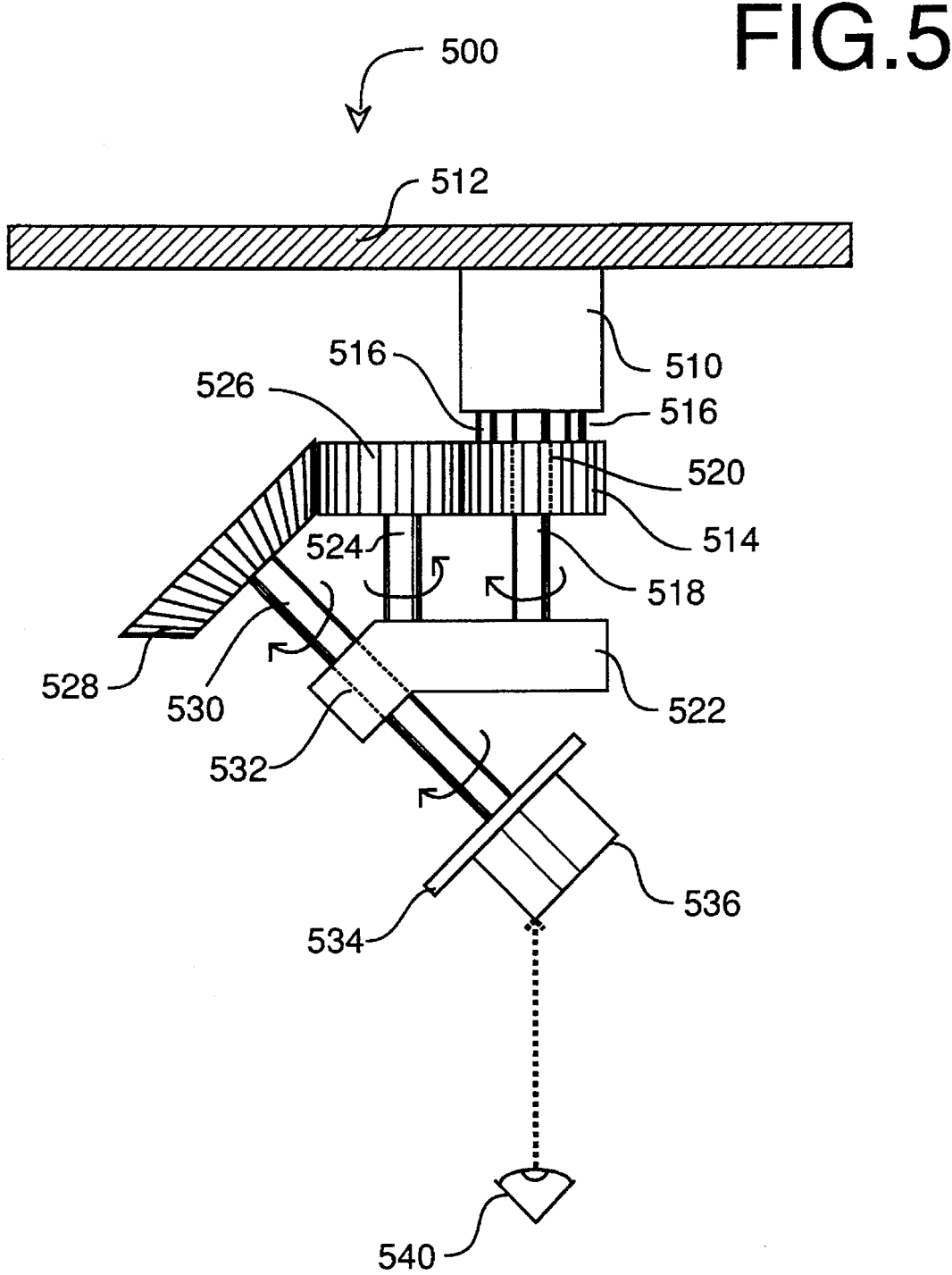
FIG. 5 illustrates a first mechanical device for producing a wobble motion in accordance with the present invention.

FIG. 5 illustrates a first mechanical apparatus 500 implementing the method for displaying a three dimensional object in accordance with the present invention. A casing of a motor 510 is anchored to a supporting structure 512. The casing is also attached to a fixed gear 514 by supporting rods 516. The motor 510 turns a shaft 518 which extends through an axial bore 520 through the center of the fixed gear 514 and which is firmly attached to a rotatable platform 522. A freely rotating shaft 524 mounted upon the platform 522 is attached to a second gear 526 which engages with the fixed gear 514. The second gear 526 engages a third (bevel) gear 528 which rotates a shaft 530 which is rotatably supported by a bearing 532 provided through an arm of the platform 522. The shaft 530 is rigidly attached to an object support plate 534. The plate 534 is adapted to support an object 536 to be viewed, which can be a ball-and-stick structure such as the structure 100 of FIG. 1, or can be any other three-dimensional object. As the shaft 518 of motor 510 turns, the platform 522 rotates around the axis of the shaft 518. The rotation of the platform 522 causes gears 526 and 528 to also rotate, causing the plate 534 to rotate around the axis of shaft 530. The combination of the rotation of platform 534 around the axis of shaft 530 and the rotation of the platform 522 around the axis of the shaft 518 will result in the "wobble" image described above from the viewpoint of an observer 540. Gears 514 and 528 should have the same number of teeth (i.e. shafts 518 and 530 should have the same rotational velocity) so that the motion is the cyclic wobble of the present invention.

Figure 6:
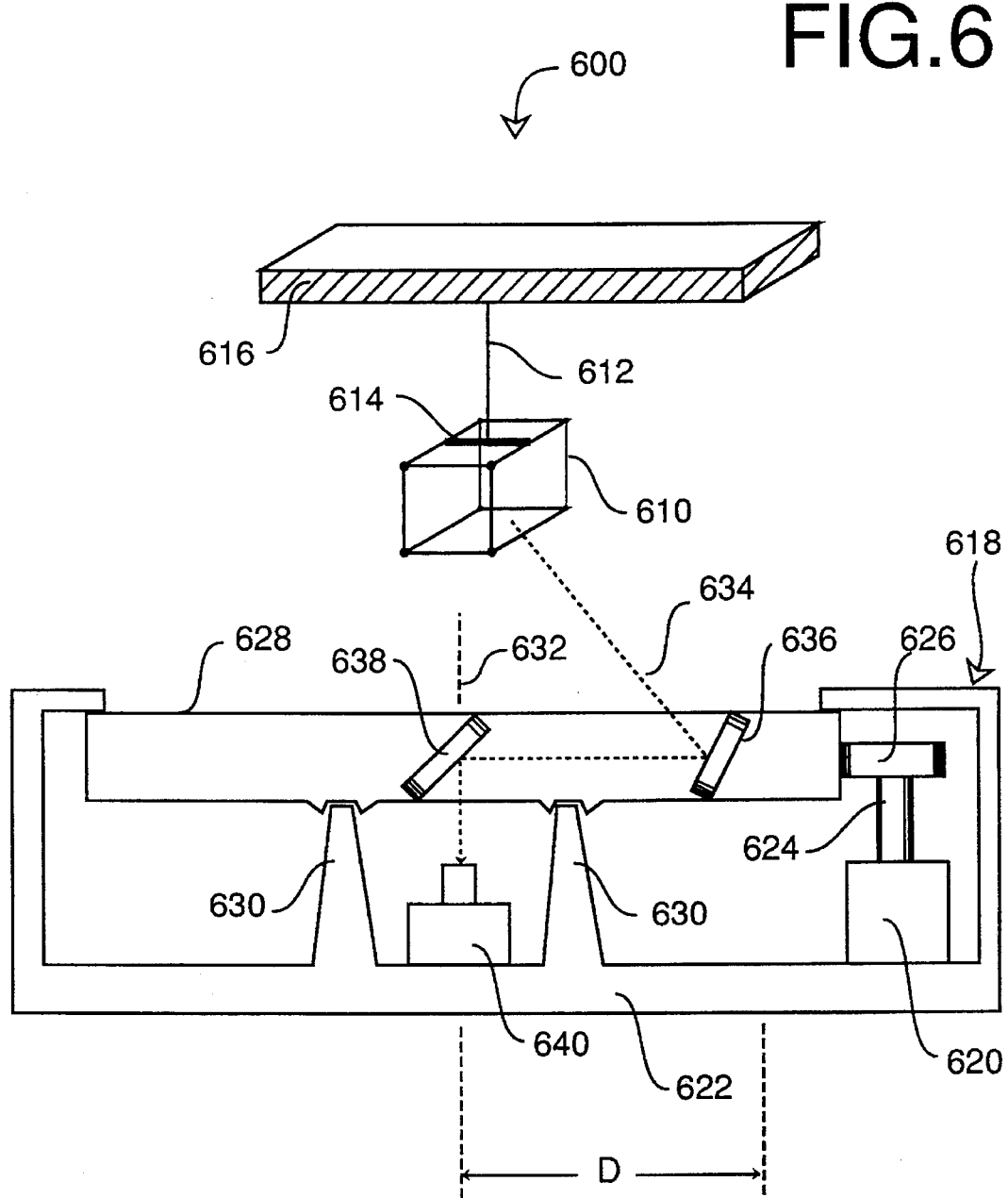
FIG. 6 illustrates a second mechanical device for producing the illusion of a wobble motion in accordance with the present invention.

FIG. 6 illustrates a second mechanical apparatus 600 for implementing the method of the present invention. An object 610 (such as the ball-and-stick structure 100 of FIG. 1) is suspended by a rod 612 attached between a cross piece 614 of the object 610 and a support structure 616. A wobble producing mechanism 618 comprises a motor 620 having a casing secured to a base 622 of the mechanism 618. A drive wheel 626 is attached to a shaft 624 of the motor 620. The drive wheel 626 is operative to rotate a wheel 628 by engaging the circumference of the wheel. The drive wheel 626 may be a friction drive wheel, or may be a gear provided with teeth (not shown) adapted to engage teeth (not shown) provided around the circumference of the wheel 628. The wheel 628 is supported by support bearings 630 and for rotation around a central axis 632 of the wheel 628. Light 634 reflected, transmitted, or radiated by the object 610 is reflected by a mirror 636 positioned at a distance D from the central axis 632 and is reflected to a second mirror 638 which is centered on the axis 632. The second mirror 638 reflects the light 634 to a image detecting device 640 (such as a video camera or movie camera) or directly to the eye of an observer. When the motor 620 is activated, the image impinging upon the detecting device 640 will have the "wobble" image described previously.

Figure 7:
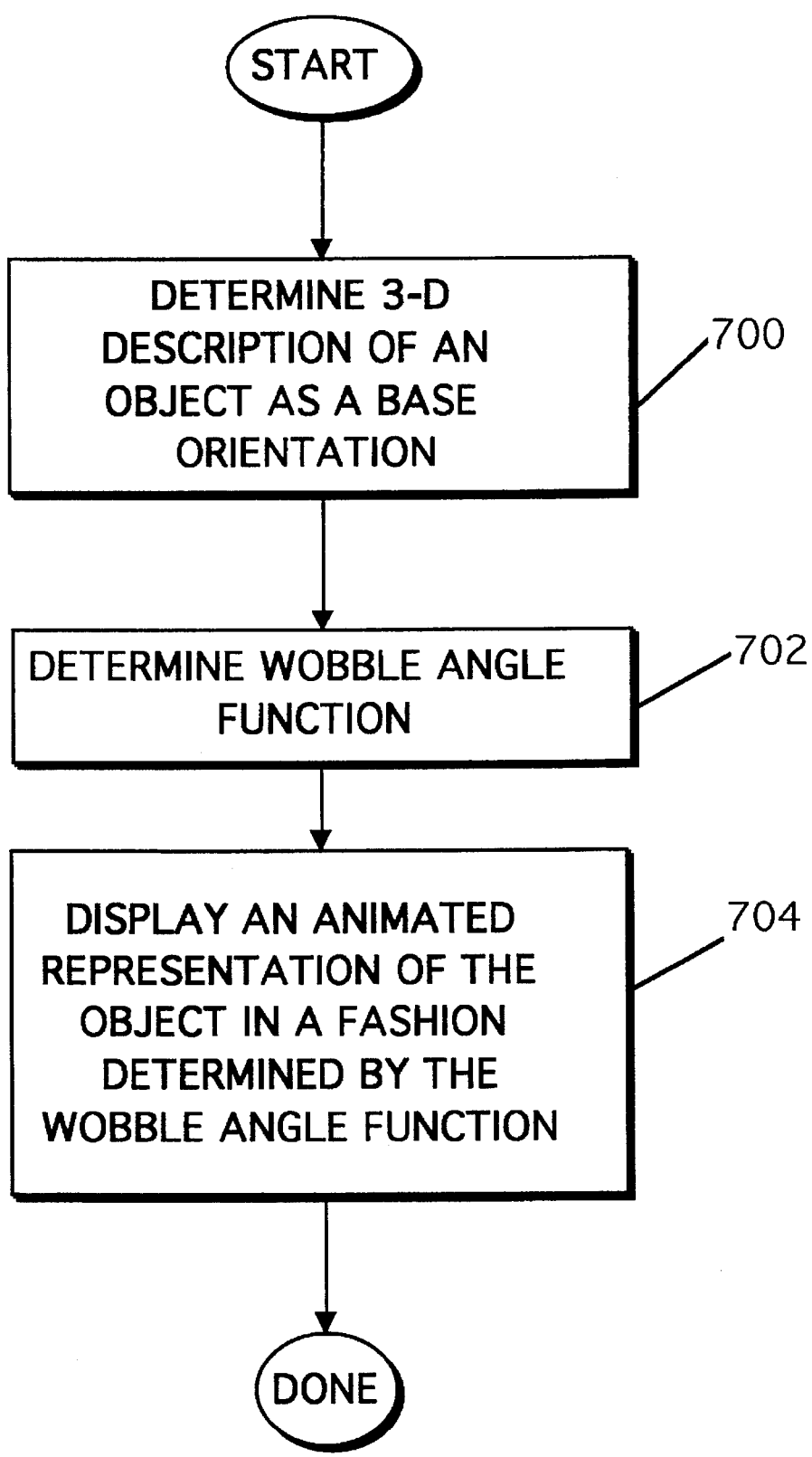
FIG. 7 is a flow diagram of a computer-implemented method for viewing an object in accordance with the present invention.

FIG. 7 is a flow diagram of a computer implemented method of the present invention for viewing a three-dimensional object, such as the object 100 of FIG. 1. In a step 700 a 3-D description of the object is developed and a base orientation is chosen. Using the object 100 as an example, the x, y, and z coordinates of the balls 102 are be input into the computer system, the interconnecting sticks are specified, and a base orientation, such as the base orientation of FIG. 3, is chosen. Such descriptions are well known to those versed in the computer arts. Next, a step 702 determines the wobble angle function. A final step 704 displays the object in an animated fashion as determined by the wobble function.

Figure 8:
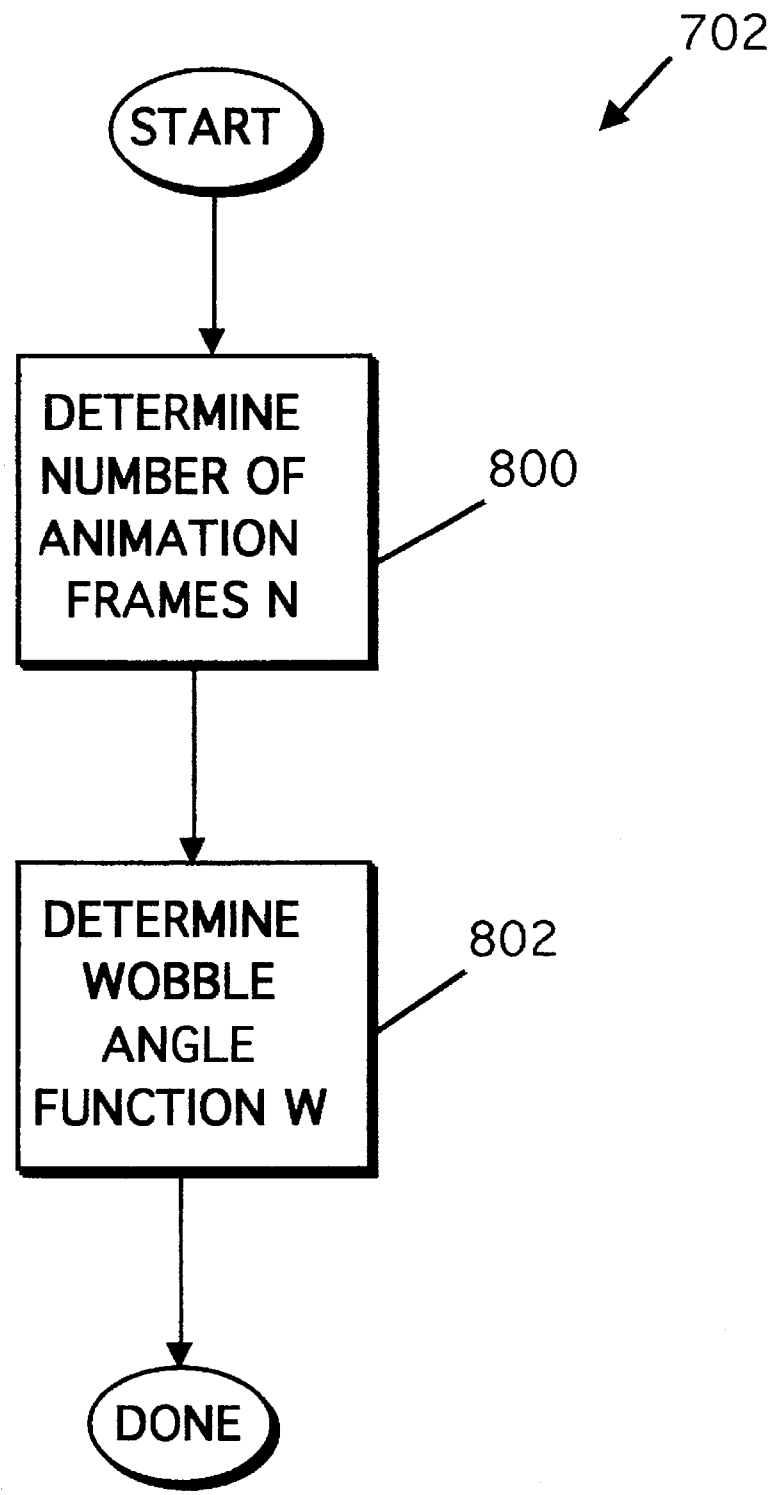
FIG. 8 is a flow diagram illustrating step 702 of FIG. 7 in greater detail.

FIG. 8 is a flow diagram illustrating step 702 of FIG. 7 in greater detail. The step 702 includes a first step 800 of determining the number of animation frames (N) that are to be used in the wobble animation. The greater the number of frames N, the smoother the animation. A second step 802 determines the desired wobble angle function (W). The greater the wobble angle function W, the more exaggerated the wobble motion displayed on the screen of the computer system implementing the process.

Figure 9:
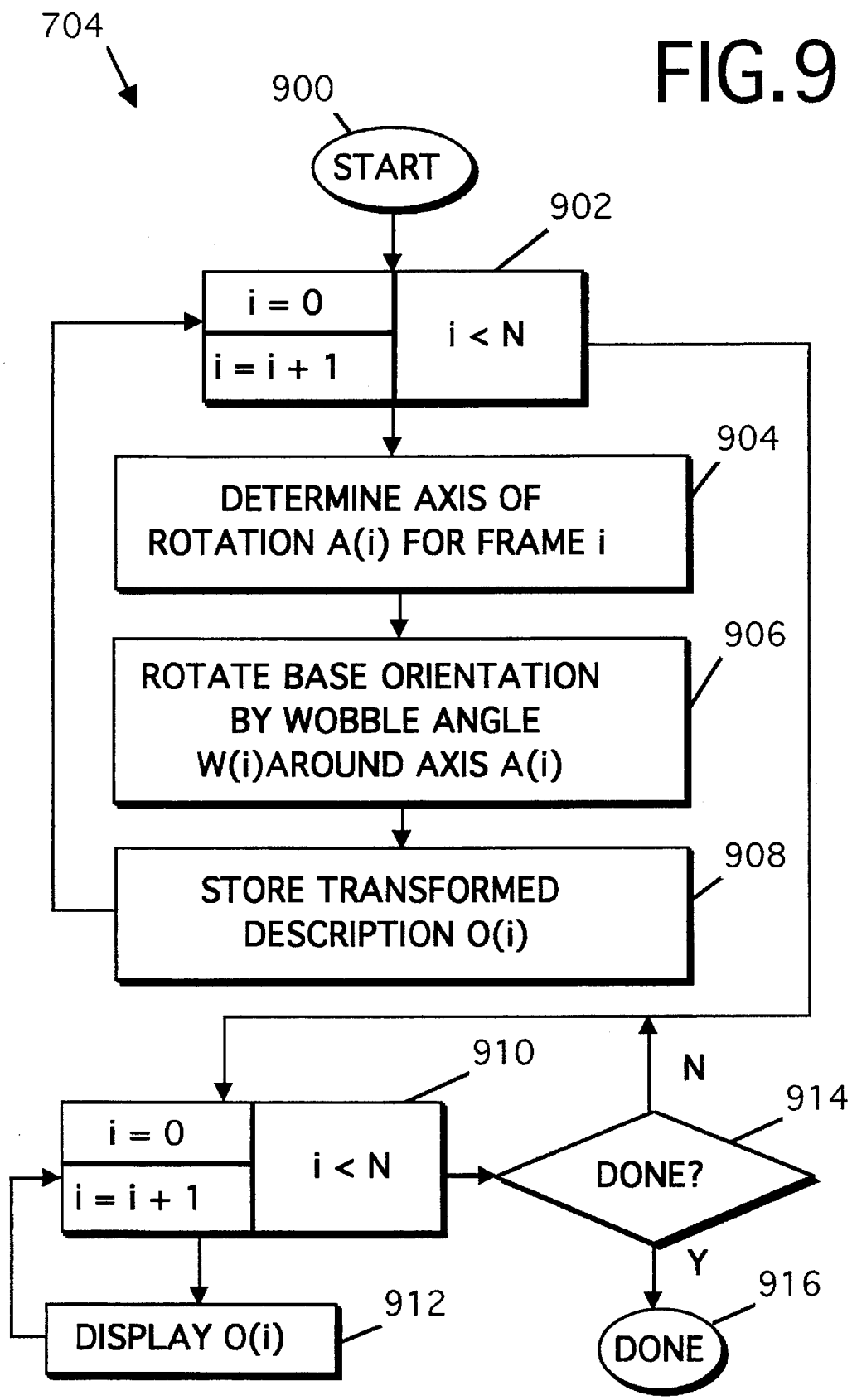
FIG. 9 is a flow diagram illustrating step 704 of FIG. 7 in greater detail.

FIG. 9 is a flow diagram illustrating the step 704 of FIG. 7 in greater detail. The process 704 begins at step 900, and an iterative loop step 902 initializes a counter i to zero. In a next step 904, an axis of rotation A(i) is determined is determined for frame i. The base orientation is rotated by a wobble angle W(i) around the axis A(i) in step 906. For a computer with limited imaging capability the transformed description O(i) is stored for later display in step 908. Next the process returns to step 902 where the counter i is incremented and it is determined whether the counter i is less than N, the number of desired frames of the animation. If so, the loop comprising steps 904–908 is repeated until all frame images are transformed and stored. Once all the images have been transformed and stored as determined by iterative loop step 902 (i.e. i≧N), process control is transferred to an iterative loop step 910 where a counter i is set to zero. In step 912 the image O(i) will be displayed, i.e. the i$^{th}$ frame of the animation, and process control returns to step 910. Once a set of N transformed descriptions have been displayed the process, i.e. one full animation sequence is displayed, a step 914 determines whether additional animation sequences are to be displayed. If so, the loop comprising steps 910 and 912 are repeated and, if not, the process is completed at 916.

Figure 10:
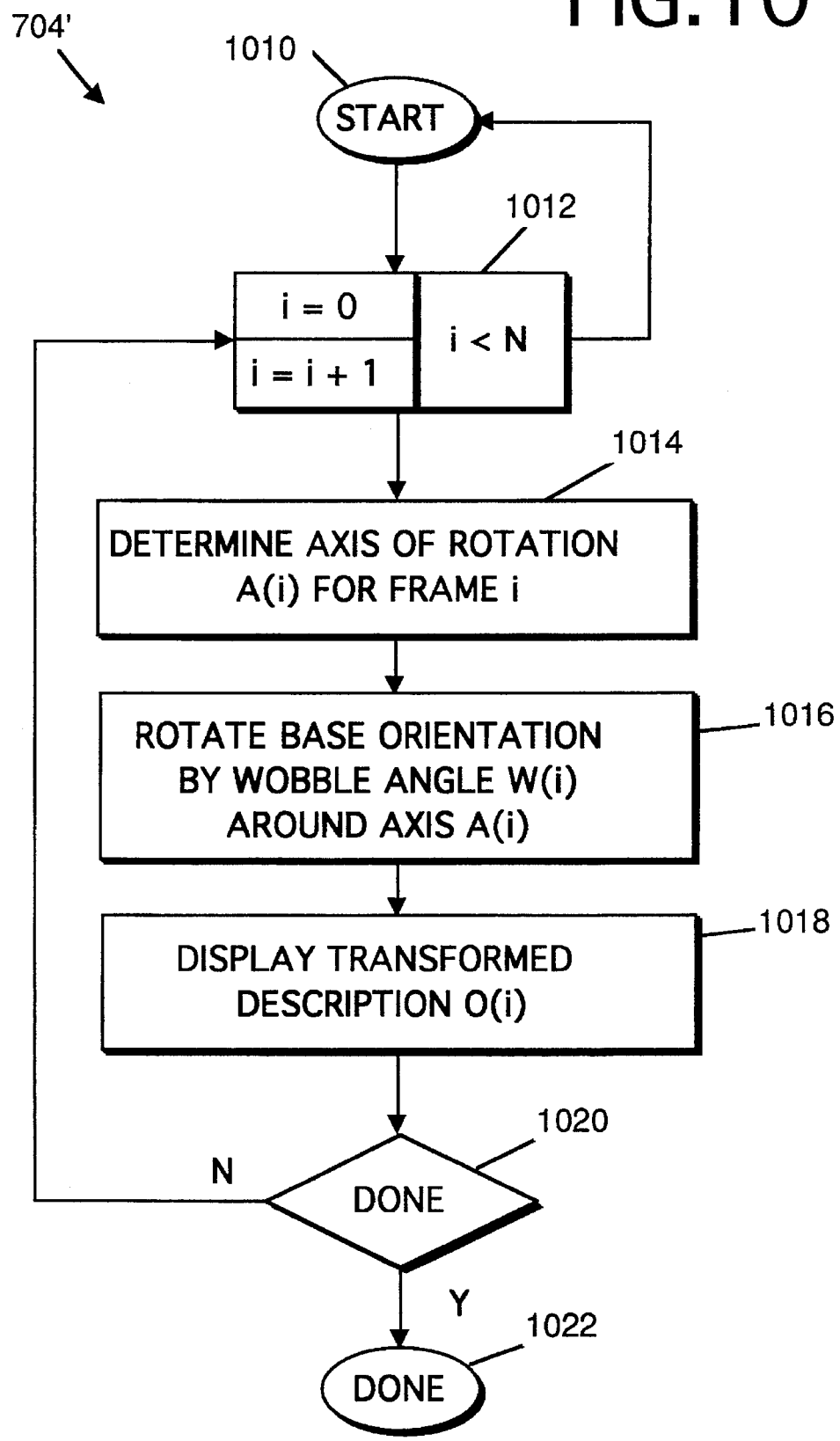
FIG. 10 is a flow diagram illustrating an alternate step 704' of FIG. 7.

FIG. 10 is a flow diagram of an alternative process 704' for implementing step 704 of FIG. 7. This process may be used when the computer implementing the process is sufficiently powerful to create and directly display the real-time images of the object. The process 704' begins at 1010, and an iterative loop step 1012 initializes a counter i to zero. A step 1014 then determines an axis of rotation A(i) for a frame i. Next, a step 1016 rotates the base orientation of the object by a wobble angle W(i) around axis A(i). Step 1018 then directly displays the transformed description O(i). A decision step 1020 determines whether the process is to be continued and, if it is not, the process 704' is completed at 1022. If the process is to be continued, process control is returned to step 1012 and the process is continued until i≧N, the number of desired frames. After N frames have been displayed, process control is returned to step 1012, the counter i is reinitialized to zero, the process is repeated.

Figure 11:
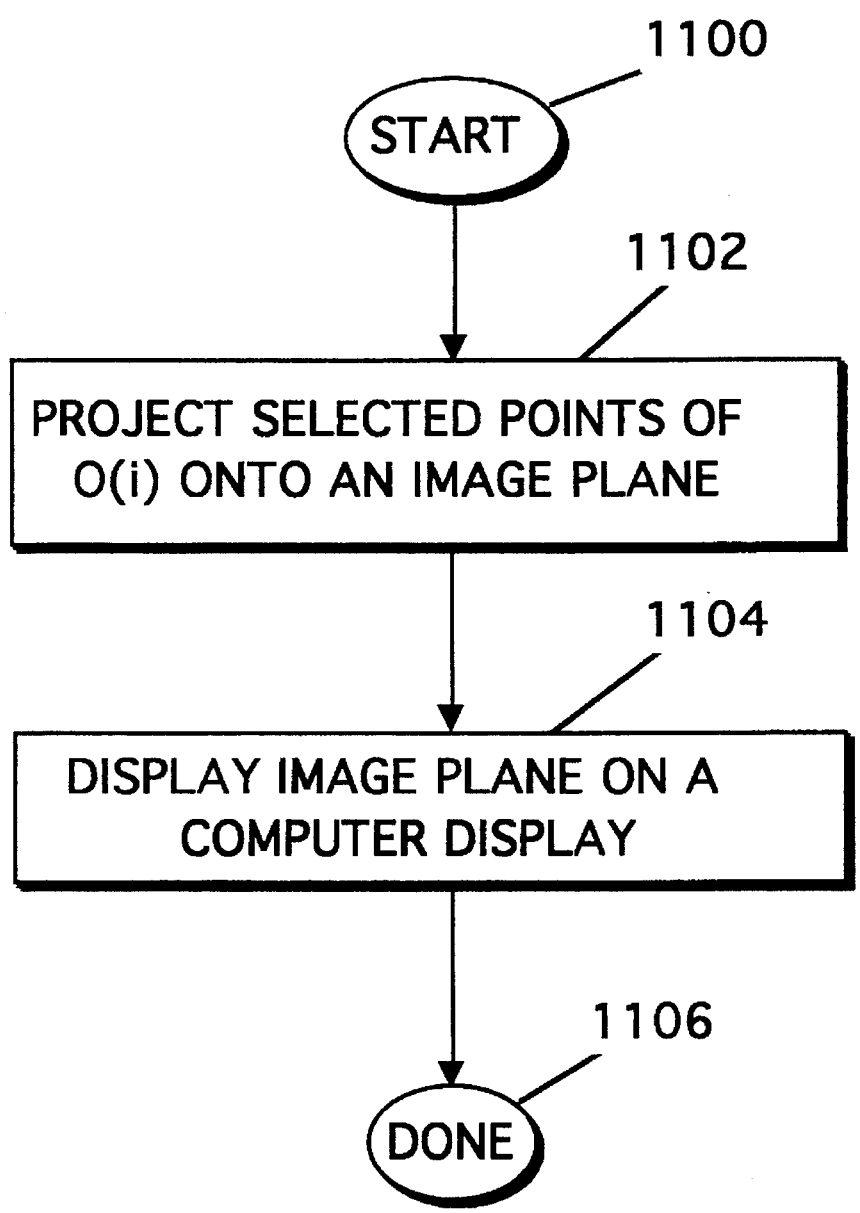
FIG. 11 is a flow diagram illustrating step 1018 of FIG. 10 in greater detail.

FIG. 11 is a flow diagram illustrating a method for displaying an object on a display, i.e. a method for implementing steps 912 of FIG. 9 and step 1018 of FIG. 10. The process begins at step 1100 and, in a step 1102, selected points of O(i) are projected onto an image plane or field. The image plane is then displayed on the CRT in step 1104. The display process is terminated in step 1106. Methods for implementing steps 1102 and 1104 are well-known to those skilled in the art. For example, 3-D imaging software such as AutoCad™ marketed by AutoDesk, Inc. of Sausalito, Calif. implement steps 1102 and 1104.

Changing the orientation of an abstract 3-D object that is being presented on a computer screen or a real object being shown on video tape, gives the viewer a better sense of the spatial relationships. Having the orientation constantly being changed and yet never wandering far from a fixed orientation helps one study the object while getting the 3-D clues supplied by the motion. Being steady and cyclic helps one study the object, because one soon learns where to expect to see a given part of the figure. The cyclic nature of the wobble, continually keeps several views of the object before the observer. Compared to stereoscopic methods, this method has both eyes see the same thing and avoids the focusing problems and associated headaches.

The process of FIG. 7 can be implemented on many general purpose computer systems as long as they have adequate video output capabilities. A preferred general purpose computer system is the Macintosh computer system marketed by Apple Computer, Inc. of Cupertino, Calif. Alternatively, personal computers based upon the IBM-PC standards or workstations such as those provided by Silicon Graphics, Sun, Hewlett-Packard, and others are also suitable platforms to run the computer implemented process of the present invention.

Figure 12:
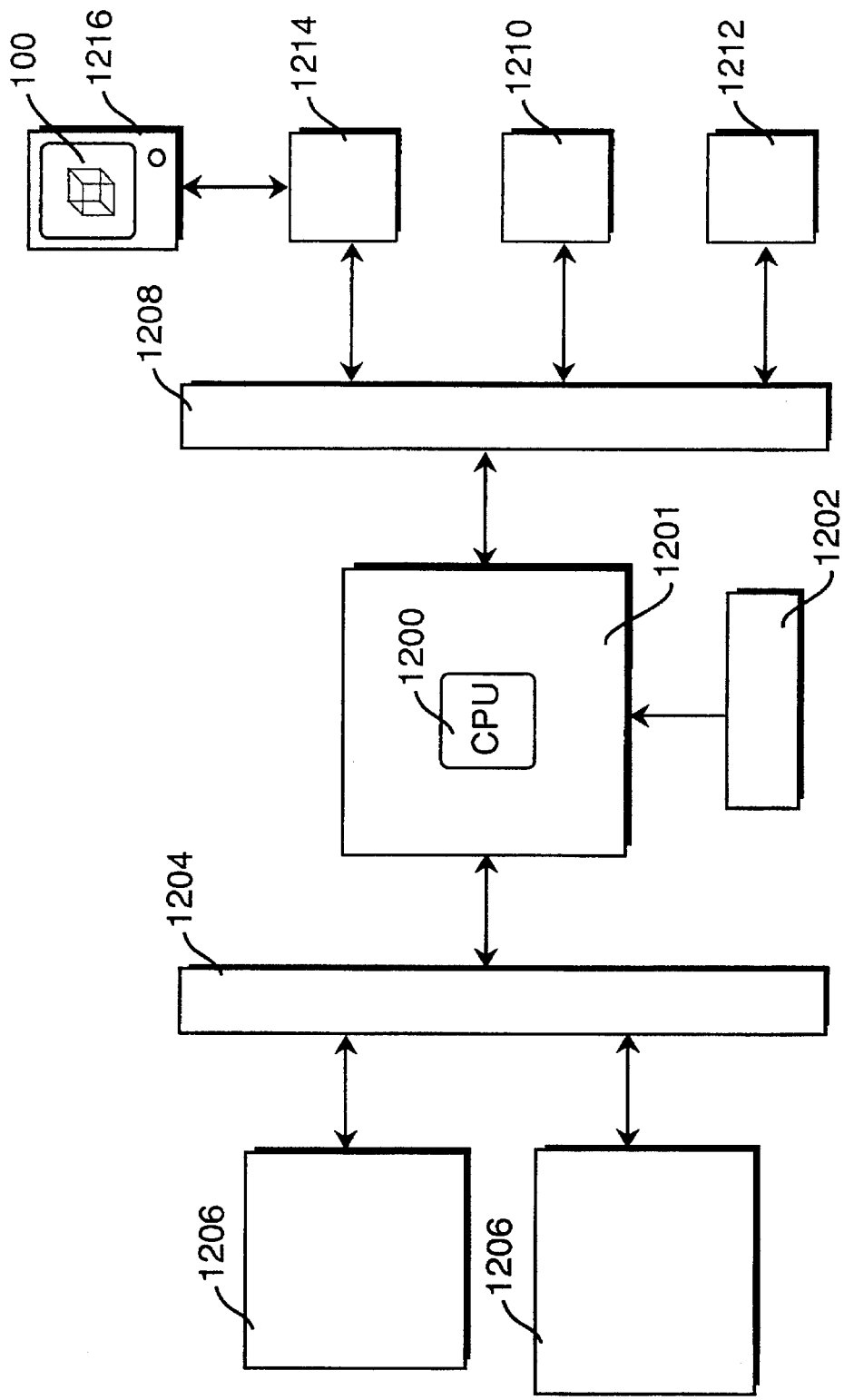
FIG. 12 is a block diagram of a computer system capable of running the computer implemented method of FIG. 7.

FIG. 12 illustrates as suitable hardware configuration for running the process of FIG. 7. A CPU 1200 is typically part of a motherboard 1201, as is well known to those skilled in the art. The motherboard 1201 has, as an input, a keyboard 1202. The motherboard 1201 is coupled to a memory bus 1204 which is coupled to memory 1206, such as dynamic random access memory (DRAM). The motherboard 1201 is also coupled to a general bus 1208, which can be coupled to a number of peripheral devices, such as a floppy disk drive 1210 or a hard disk drive 1212. A video card 1214 is coupled to the general bus 1208 and drives a monitor 1216, such as a color video display monitor based on cathode ray tube (CRT) or liquid crystal technology.

A computer program implementing the process of FIG. 7 is typically stored on the hard disk drive 1212 and runs on CPU 1200 in conjunction with the computer's operating system. An image of the wobbling object 100 is displayed on the screen of the monitor 1216 as a sequence of frames, as described previously. Of course, the process of the present invention can be implemented on a variety of computer systems, and can be implemented in many combinations of hardware and software, as is well known to those skilled in the art.

While this invention has been described in terms of the preferred embodiment, it is contemplated that alterations, modifications and permutations thereof will become apparent to those skilled in the art upon a reading of the specification and study of the drawings. For example, the wobble image produced by the method of the present invention can be displayed contemporaneously, or it can be stored and played back at a later time. For computer generated images, many computers provide video outputs which can be fed directly into a video recorder or the like. For mechanical versions of the present invention, a video camera or movie camera can record the wobbling image for later study. Also, as an object wobbles on a video screen, it can additionally change in shape, size, color, etc. and/or portions can be added or removed. It is therefore intended that the following appended claims include all such alterations, modifications and permutations as fall within the true spirit and scope of the present invention.

What is claimed is:

1. A method for displaying a series of two-dimensional representations of a three-dimensional object to a viewer to provide said viewer a three-dimensional image of said three-dimensional object, said method comprising the steps of:

(a) defining a coordinate system including three mutually orthogonal unit vectors, e1, e2, and e3;

(b) defining automatically a base orientation of said three-dimensional object;

(c) transforming automatically said base orientation of said object by applying to said base orientation a rotational wobble function W(s, t) to provide a transformed base orientation of said three-dimensional object, said application of said rotational wobble function W(s, t) including the steps of:

(i) rotating said unit vector e1 by s radians about said unit vector e3 to produce a vector V; and (ii) rotating said base orientation about said vector V by t radians to obtain thereby a transformed base orientation of said three-dimensional object;

(d) repeating step (c) to generate a series of transformed base orientations of said three-dimensional object; and (e) generating a sequential display of two-dimensional representations of said series of transformed base orientations of said three-dimensional object to provide a smooth repetitive motion of two-dimensional representations of said object wherein said object maintains a substantially constant orientation such that the total display of said two-dimensional representations provides said viewer a three-dimensional image of said three-dimensional object, wherein said sequential display does not include two-dimensional representations of said base orientation.

2. The method of claim 1, wherein said steps (c) and (d) further include the steps of:

(a) determining a number N of desired transformed images;

(b) setting the variable s equal to $i\Delta s$, wherein $\Delta s$ is equal to $2\pi/N$ and i is an integer between 0 and N;

(c) setting variable t equal to a desired constant having a value between 0 and $2\pi$ radians; and (d) successively applying said rotational wobble function W(s,t), to said base orientation to generate said series of N transformed orientations, wherein following each application of said rotational wobble function, i is incremented through the range of 0 to N such that the $N^{th}$ transformed orientation is substantially identical to the first transformed orientation whereby said series of transformed orientations may be displayed cyclically.

3. A method for displaying a two-dimensional image as described in claim 1 wherein each of said images in said sequence deviates from said base orientation by less than about $2\pi$ radians.

4. A method for displaying a two-dimensional image as described in claim 3 wherein each of said images in said sequence deviates from said base orientation by less than about $\pi/4$ radians.

5. A method for displaying a two-dimensional image as described in claim 4 wherein each of said images in said sequence deviates from said base orientation by less than about 0.17 radians.

6. A method for displaying a two-dimensional image as described in claim 1 further including the step of varying s by a non-zero constant between transformations.

7. A method for displaying a two-dimensional image as described in claim 1 further including the step of varying s by a non-constant.

8. A method for displaying a sequence of two-dimensional images as described in claim 1 wherein said sequence of two-dimensional images is generated by a computer and displayed on a computer display screen.

9. A method for displaying a sequence of two-dimensional images as described in claim 1 wherein said three dimensional object is a physical object and said two-dimensional image is a projection of said physical object onto a two-dimensional surface.

10. A computer system for providing a viewer a three-dimensional image of a three-dimensional object, said computer system comprising:

a coordinate system generator effective to provide a coordinate system including three mutually orthogonal unit vectors, e1, e2, and e3;

b) a base orientation coordinate generator effective to provide a set of base coordinates corresponding to a base orientation of said three-dimensional object;

c) a transformation engine effective to transform repeatedly said base coordinates by applying to said base coordinates a rotational wobble function W(s, t), said application of said rotational wobble function W(s, t) including:

i) rotating said unit vector e1 by s radians about said unit vector e3 to produce a vector V; and ii) rotating said base coordinates about said vector V by t radians to obtain thereby a transformed set of coordinates corresponding to a transformed base orient:ion of said three-dimensional object;

to generate thereby a series of transformed coordinate sets corresponding to a series of transformed base orientations of said three-dimensional object; and d) a display mechanism effective to display said series of transformed coordinate sets as a smooth repetitive motion of two-dimensional representations of said transformed base orientations of said object wherein said object maintains a substantially constant orientation such that the total display of said two-dimensional representations provides said viewer a three-dimensional image of said three-dimensional object, wherein said sequential display does not include said coordinates corresponding to said base orientation.

11. The computer system of claim 10, wherein said transformation engine further includes:

a) a granularity controller to determine a number N of desired transformed images; and b) an incrementor to set said variable s equal to $i\Delta s$, wherein $\Delta s$ is equal to $2\pi/N$ and i is an integer between 0 and N, and set said variable t is set to a desired constant having a value between 0 and $2\pi$ radians, such that said rotational wobble function W(s, t) is applied to said base coordinates to generate a series of N transformed orientations wherein following each application of said rotational wobble function, said variable i is incremented through the range 0 to N such that the $N^{th}$ transformed orientation is substantially identical to the first transformed orientation whereby said series of transformed orientations may be displayed cyclically.

12. The computer system for displaying a two-dimensional image as described in claim 10 wherein each of said images in said sequence deviates from said base orientation by less than about 2p radians.

13. The computer system for displaying a two-dimensional image as described in claim 12 wherein each of said images in said sequence deviates from said base orientation by less than about p/4 radians.

14. The computer system for displaying a two-dimensional image as described in claim 13 wherein each of said images in said sequence deviates from said base orientation by less than about 0.17 radians.

15. The computer system for displaying a two-dimensional image as described in claim 10 further including computer readable program code devices configured to cause a computer to vary s by a non-zero constant between transformations.

16. The computer system for displaying a two-dimensional image as described in claim 10 further including computer readable program code devices configured to cause a computer to vary s by a non-constant value.

* * * * *